United States Patent
DeLorenzo et al.

[11] 3,839,700
[45] Oct. 1, 1974

[54] TRAFFIC SENSOR

[75] Inventors: Joseph D. DeLorenzo, Sudbury;
Hubert R. Durling, Lancaster;
Norman F. Rolfe, Wakefield; Gerald F. Ross, Lexington, all of Mass.

[73] Assignee: Sperry Rand Corporation, New York, N.Y.

[22] Filed: Feb. 13, 1973

[21] Appl. No.: 331,715

[52] U.S. Cl. .............................................. 340/38 L
[51] Int. Cl. ............................................ G08g 1/02
[58] Field of Search ..... 340/38 L, 38 R, 38 S, 31 R, 340/23, 22, 258 D

[56] References Cited
UNITED STATES PATENTS

| | | | |
|---|---|---|---|
| 1,806,039 | 5/1931 | Bossart | 340/38 L |
| 1,953,546 | 4/1934 | Wells | 340/31 R |
| 2,760,182 | 8/1956 | Rechten et al. | 340/38 L |
| 3,024,411 | 3/1962 | Hours | 340/38 R |

*Primary Examiner*—William C. Cooper
*Attorney, Agent, or Firm*—Howard P. Terry

[57] ABSTRACT

A passive magnetic sensor placed in the pavement of a road way includes a symmetric soft iron magnetic circuit configuration having a centrally located pick off solenoid; the ends of the soft iron magnetic circuit are supplied with permanent magnet plates of high magnetic coercivity material for establishing a high reluctance magnetic field path above the pavement. Passage of a vehicle through the path over the sensor results in a Faraday law yield of power to excite an oscillator whose transient radio frequency output is then radiated to actuate remotely located utilization equipment.

11 Claims, 7 Drawing Figures

3,839,700
FIG.1.
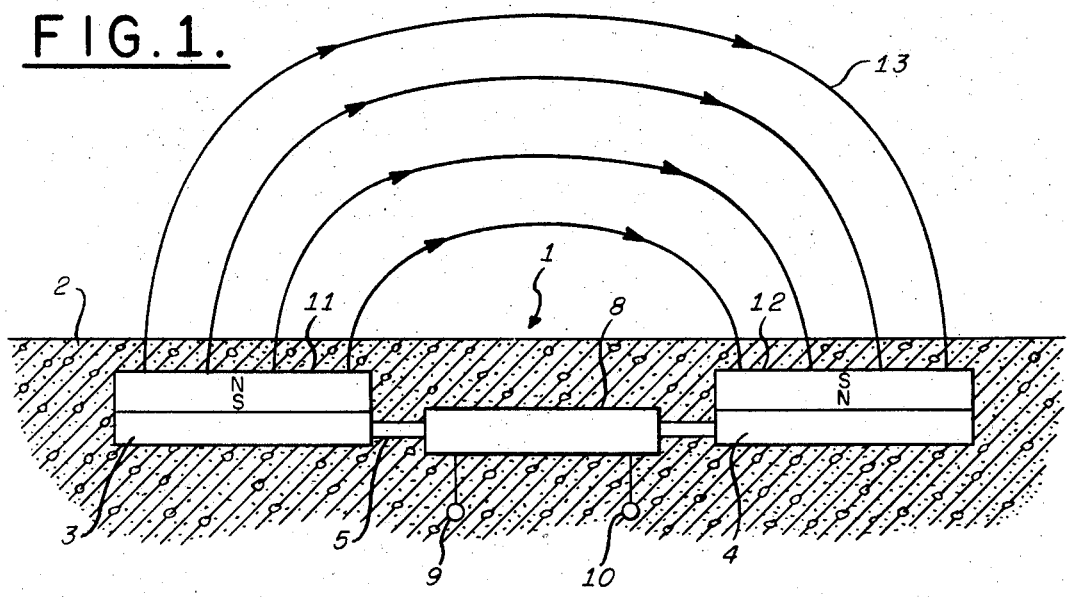
FIG.2.
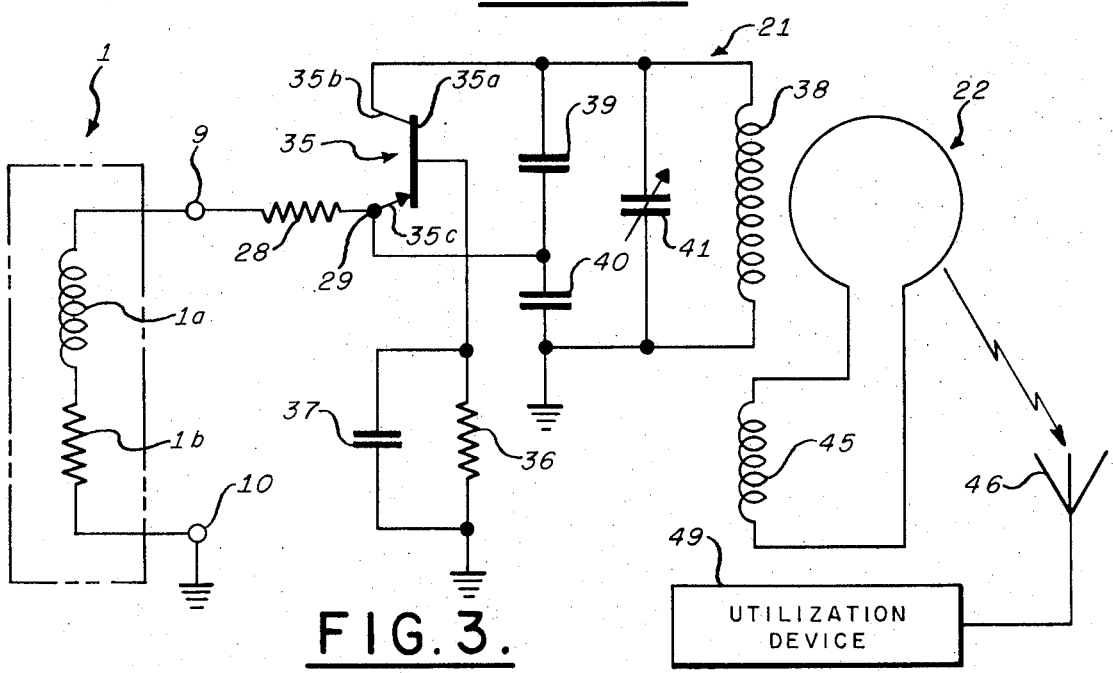
FIG.3.

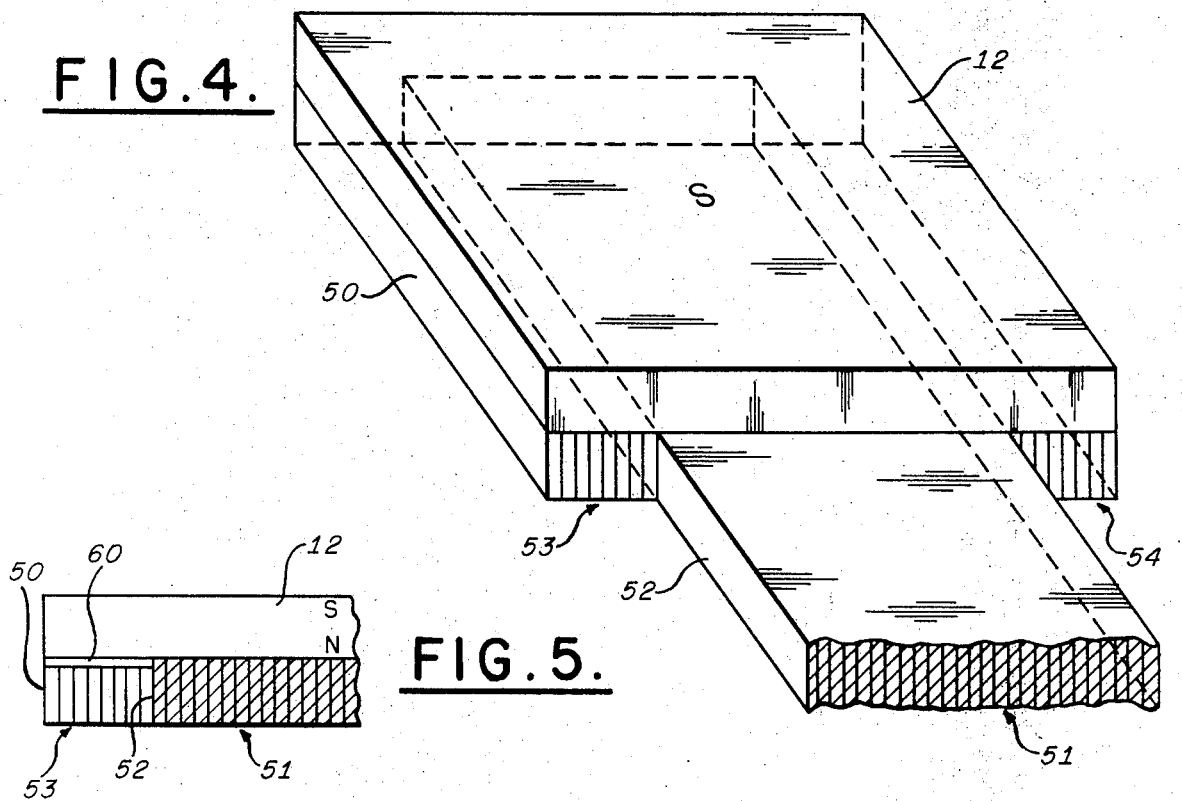

TRAFFIC SENSOR

BACKGROUND OF THE INVENTION

1. Field of the Invention

The invention pertains to passive apparatus for detecting the passage of a vehicle or other ferromagnetic object and more particularly concerns apparatus of the self-energizing type adapted for long life operation below the surface of a pavement or passage way for detecting the passage of vehicles.

2. Description of the Prior Art

The prior art is known to include a variety of vehicle sensors that have been used in the past with varying degrees of success for detecting the presence of a moving vehicle within the field of detection characteristic of the sensor as, for instance, within a particular vehicular traffic lane. Inductive sensors buried in the pavement, such as loops, magnetometers, and flux valve systems have been popular, as well as mechanical treadles. Optical systems using photocell sensors have been considered for some purposes. Other above-the-road-surface sensors such as radio and ultrasound presence sensors have also been investigated.

One general class of vehicle sensors often requires considerable space when buried in the pavement, and original installation and replacement after failure are therefore expensive and cause inconvenience to the motoring public, especially in urban areas. Power supply lines must also be buried in the road way for such prior art sensors, as well as output signal leads. Installation and replacement of these conductors, though simple in principle, are also expensive in cost and represent an inconvenience to the motorist.

Other types of vehicle sensors, such as photoelectric devices, are easily confused and may completely fail in stormy weather conditions, as are radio sensors. Radio and ultrasound sensors are relatively expensive to purchase and install and often require replacement after relatively short lives. Though the initial cost of the sensor is low or moderate, its installation and replacement costs may be high. When the sensor cost is high, as in the case of radio detectors, cost of installation and maintenance is generally high, though inconvenience to the public may sometimes be avoided during installation or replacement. In general, installation and maintenance costs of vehicle presence sensors considerably exceed the initial purchase price of the sensor.

SUMMARY OF THE INVENTION

The present invention is a compact, inexpensive, passive magnetic device for sensing the transient presence of a passing vehicle or other ferromagnetic object. Normally buried or otherwise placed slightly below or at the surface of a road or passage way pavement, it includes an elongate symmetric open magnetically soft magnetic circuit serving as a core for a centrally located solenoidal pick-off coil. The ends of the magnetically soft iron magnetic circuit are capped with permanent magnet plates of a material having temperature-stable high magnetic coercivity for establishing a high reluctance magnetic field within the vehicle path above the road way surface. Passage of a vehicle or other ferromagnetic object over the sensor changes the reluctance of the magnetic path which induces a voltage in the coil for exciting an oscillator whose radio frequency oscillation is then radiated. The radiated signal is detected by a road side or other remote receiver for momentary actuation of utilization equipment in response to the vehicle presence signal.

BRIEF DESCRIPTION OF THE DRAWINGS

FIG. 1 is an elevation view of the magnetic sensor shown in position in a cross section of a pavement or passage way surface.

FIG. 2 is a plan view of the sensor of FIG. 1.

FIG. 3 is a drawing showing the components and electrical interconnections of a transmitter and receiver circuit excited by the sensor of FIGS. 1 and 2.

FIG. 4 is a partial perspective view of a structure similar to that of FIGS. 1 and 2 in partial cross section for showing the use of laminated elements.

FIG. 5 illustrates an alternative form of the structure of FIG. 4.

FIGS. 6 and 7 are graphs useful in explaining the operation of the invention.

DESCRIPTION OF THE PREFERRED EMBODIMENTS

FIGS. 1 and 2 illustrate a novel vehicle sensor 1 overcoming the deficiencies of the prior art. In FIG. 1, the sensor 1 is seen buried or otherwise enclosed in a road or passage way or other pavement 2, the sensor being adapted for use, for example, in pavements constructed of any of the various common types of conventional pavement materials. As in FIGS. 1 and 2, the sensor 1 consists of a pair of spaced magnetically soft iron plates 3 and 4 having opposed major surfaces and which may be rectangular or of other convenient shape. The planar sheets or plates 3 and 4 are connected by an elongate magnetically soft iron rod or core 5 which may be inserted into plates 3 and 4 at the rod ends 6 and 7 and fastened therein so as to lie substantially in the same plane as the plates 3 and 4. Fastening may be accomplished by threading or force-fitting the mating parts or by other convenient conventional means. Rod or core 5 magnetically couples plates 3 and 4 and is supplied with a centered multi-turn coil 8 of solenoidal form having electrical terminals 9 and 10.

The matnetically soft iron plates 3 and 4 which inherently have a relatively low coercivity are capped with permanent magnet plates 11 and 12 oppositely polarized as indicated in FIG. 1 which plates 11 and 12 may conveniently also be rectangular of the same general breadth and width as soft iron plates 3 and 4, and are provided with opposed major surfaces. Other shapes may alternatively be employed and the shapes of permanent magnet plates 11 and 12 are not required to correspond exactly to the shapes of magnetically soft iron planar sheets of plates 3 and 4. It is seen from FIG. 1 that the magnetically soft iron elongate rod 5 and the associated iron plates or planar sheets 3 and 4 serve as an elongate part of the magnetic circuit for permanent magnets 11 and 12, which elongate magnetic circuit is, for example, completed in the high reluctance air path above the surface of pavement 5, as is indicated by the normally disposed magnetic lines of force 13 in FIG. 1.

The magnetically soft iron plates 3 and 4 and the coupling iron core 5 are constructed of a conventional soft magnetic material such as used in ordinary transformers, motors, relays, and other commercial electromagnetic equipment, and such as are characterized by coercive forces usually about one oersted. Silicon-iron alloys having 3 to 5 per cent silicon may be employed.

The material used for the permanent magnet plates 11 and 12 is preferably one of the commercially available strontium oxide ferrite magnetic materials having a high coercive force and substantially zero thermal coefficients of remanence and coercive force, though other magnetic materials having similar properties may be substituted. These sintered permanent magnets, having a high coercive force, withstand large demagnetizing forces. They are also substantially immune to mechanical shock and have superior low and high temperature performance (operating as low as −40°C). Examples of such materials demonstrate coercive force characteristics as high or higher than 3,000 oersteds, residual flux densities in the neighborhood of 4,200 gauss, a temperature coefficient of coercive force of 0.1 to 0.2 per cent per °C., and a temperature coefficient of remanence of 0.2 per cent per °C., both of the latter being referred to room temperature. Plates of such materials are readily bonded to the magnetically soft iron plates 3 and 4 by the use of conventional metal bonding agencies such as room setting epoxy resins or the like or by other ordinary mechanical means.

One model of the invention, a version of the device of FIGS. 1 and 2, employed plates 3, 4, 11, and 12 each of dimensions substantially 5 by 7 by 1 inch with a 0.5 inch diameter rod 5 of length 10 inches and with a solenoidal coil 8 having substantially 20,000 turns of number 28 insulated copper wire. Such a structure may be inserted with ease in a relatively small hole cut into the surface of the passage way or pavement (24 by 6 inches by 3 inches deep).

As illustrated in FIG. 3, the transient output of the elongate sensor 1 is processed for causing a transmission of millisecond duration energy to a remotely located utilization device 19 upon the passage of a vehicle and comprises a conventional oscillator 21 for exciting the loop antenna 22. In FIG. 3, sensor 1 is illustrated by its equivalent electrical circuit as comprising the series connected inductance 1a and resistance 1b with the associated terminals 9 and 10. Terminal 9 is connected through series resistor 28 for isolation purposes directly to the emitter terminal of the transistor oscillator 21. When the passage of a vehicle produces an output at terminals 9 and 10, this voltage supplies power momentarily for the excitation of high frequency oscillator 21. It will be apparent to those skilled in the art that an impedance matching pulse transformer may be placed between terminals 9 and 10 and resistor 28 for improved efficiency.

Oscillator 21 may be a radio frequency oscillator selected from any of several well known simple, relatively stable oscillator circuits for exciting loop antenna 22, including the conventional Colpitts kind of sine wave transistor oscillator illustrated in FIG. 3. Oscillator 21 employs a transistor 35 which may be of the 2N1500 type having a base coupled to resistor 36, resistor 36 being shunted by capacitor 37 and connected to ground. Junction 29 is coupled to emitter 35c. Emitter 35c and collector 35b are connected to a resonant tank circuit including inductance 38 and capacitors 39 and 40 and the adjustable trimming capacitor 41. The circuit parameters of oscillator 21 are arranged in a conventional manner so that the presence of a transient wave form at junction 29 is sufficient to cause oscillator 21 to break into radio frequency sine wave oscillation for a short time period. The oscillation frequency is established in the factory, for example, by setting the trimming capacitor 41, according to the proposed function or location of the sensor.

The radio frequency output of oscillator 21 is coupled inductively between the tank circuit inductance 38 serving as a primary winding and the secondary coil 45 across which loop antenna 22 is coupled. Loop antenna 22 is arranged to be physically a part of the sensor structure 1 of FIGS. 2 and 3 which is buried in the pavement 2 and may take convenient shapes including circular. Loop antenna 22 may be placed with the plane of its loop in a horizontal position, for example. In such a disposition, loop antenna 22 will radiate the brief radio frequency signal generated by oscillator 21 upon the passage over sensor 1 of a vehicle at a speed as low as one mile per hour; the range of the transmitter at this speed, for example, is 300 feet when it excites a suitable antenna 46 and a utilization device 49. Utilization device 49 may include a radio frequency receiver and other utilization equipment including counter, signal, alarm, computer, or other means as are conventionally associated with vehicle sensors. The radiated signal may be coded to reduce noise interference or to provide for traffic lane discrimination.

As previously noted, the plates 3 and 4 and core 5 of FIGS. 1 and 2 may be made of solid soft magnetic material; alternatively, a more efficient structure using laminated plates of such material, as in plate 50 of FIG. 4, may be employed, this structure being effective for reducing eddy current effects in plates 3 and 4 and core 5. The core 52 within solenoidal coil 8 is now made up of a plurality of laminations 51 which extend into and form a major portion of plate 50 beneath the polarized magnet plate 12. The volume of the soft-magnetic plate 50 not formed by the core laminations 51 is now made up by symmetrically placed bundles of short laminations 53 and 54 placed on either of core 52. Thus, a complete laminated plate 50 is formed which normally is selected to match the major dimensions of the polarized magnet plate 12. It is observed that laminations 51, 53, and 54 are oriented at right angles to the major surface of the plates 12 and 50. In FIG. 5, it is illustrated that a lamination 60 may be placed on its side at the interface between soft iron plate 50 and the magnet plate 12 for improving the efficiency of magnetic coupling of the field into the laminations 51 of core 52.

Operation of the invention will be apparent to those skilled in the art on the basis of the foregoing description. It will be understood that the passage of a vehicle or other ferromagnetic object through the magnetic field represented by the lines of force 13 of FIG. 1 induces a brief output signal at terminals 9, 10, since the reluctance of the air path of the field is significantly decreased in the presence of the vehicle or other object. The output wave at terminals 9, 10 has an amplitude related to the rate of change with time of the magnetic circuit's total reluctance. With an appropriate number of turns of wire for solenoid coil 8, a signal of significant amplitude is generated at terminals 9, 10, even for a slowly moving vehicle. For example, the signal induced at terminals 9, 10 by the passage of one type of medium priced passenger vehicle at 15 miles per hour is shown in the graph of FIG. 6. The same vehicle moving at 30 miles per hour produced the wave form of FIG. 7. The voltage induced at terminals 9, 10 is the sole voltage used to excite oscillator 21, so that sensor 1 desirably needs no other source of power such as a battery buried with it or wires extending to a source of utility power. The oscillator 21, in a typical example, requires only a one volt excitation to cause it to burst into oscillation.

It is seen that the invention is a compact, passive magnetic traffic sensor of low initial cost which may be inexpensively installed below the surface of a road way. No mechanical parts are involved. No connection through the pavement to an electrical power source is required, nor are electrical conductors needed for transmitting vehicle presence signals to utilization equipment. Only long-life elements are employed which are substantially immune to ambient conditions, so that freedom of repair and long operating life are assured.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. Sensor means adapted to detect passage of a ferromagnetic object along a surface of a passage way comprising:
   first and second spaced substantially planar polarized magnet means having opposed major surfaces adapted to be placed substantially parallel to said passage way surface,
   said first and second spaced substantially planar magnet means being magnetically polarized in opposite senses with poles at said respective opposed major surfaces,
   first and second spaced substantially planar magnetic circuit means respectively affixed one each to a major surface of said first and second spaced substantially planar polarized magnet means,
   elongate magnetic core means for magnetically coupling said first and second spaced substantially planar magnetic circuit means, and
   electrical pick off means coupled to said elongate magnetic core means for producing an output upon passage of said ferromagnetic body proximate said sensor means.

2. Apparatus as described in claim 1 wherein said first and second spaced substantially planar polarized magnet means are constructed of a first material having substantially higher magnetic coercivity than said first and second spaced substantially planar magnetic circuit means.

3. Apparatus as described in claim 2 wherein said first material is a strontium oxide ferrite magnet material.

4. Apparatus as described in claim 1 wherein said first and second spaced substantially planar magnetic circuit means lie in a substantially common plane including said elongate magnetic core means.

5. Apparatus as described in claim 4 wherein said first and second spaced substantially planar magnetic circuit means are substantially rectangular.

6. Apparatus as described in claim 4 wherein said electrical current pick off means comprises multiple turn solenoidal coil means substantially centrally disposed about said elongate magnetic core means.

7. Apparatus as described in claim 1 further including radio frequency oscillator means,
   coupling circuit means responsive to said electrical pick off means for causing oscillations to be generated by said radio frequency oscillator means,
   antenna means for space radiation of said oscillations, and
   utilization means responsive to said space radiated oscillations.

8. Apparatus as described in claim 7 wherein said antenna means comprises loop antenna means lying in a plane substantially parallel to said first and second spaced substantially planar polarized magnet means.

9. Apparatus as described in claim 1 wherein said first and second spaced substantially planar magnetic circuit means comprises a plurality of laminations with thin dimensions lying parallel to said major surfaces.

10. Apparatus as described in claim 1 wherein said elongate magnetic core means comprises a plurality of laminations with their thin dimensions lying parallel to said major surfaces and forming a substantial portion of said first and second spaced substantially planar magnetic circuit means.

11. Apparatus as described in claim 9 wherein a thin lamination lying perpendicular to said plurality of laminations lies in the interface between one portion of said first and second spaced substantially planar polarized magnet means and said first and second spaced planar magnetic circuit means.

* * * * *